United States Patent
Surtani et al.

(10) Patent No.: US 8,914,599 B2
(45) Date of Patent: Dec. 16, 2014

(54) LOCK AMORTIZATION IN A DATA COUNTER

(75) Inventors: Manik Surtani, London (GB); Vladimire Blagojevic, Toronto (CA)

(73) Assignee: Red Hat, Inc., Raleigh, NC (US)

(*) Notice: Subject to any disclaimer, the term of this patent is extended or adjusted under 35 U.S.C. 154(b) by 1051 days.

(21) Appl. No.: 12/903,028

(22) Filed: Oct. 12, 2010

(65) Prior Publication Data
US 2012/0089784 A1    Apr. 12, 2012

(51) Int. Cl.
  *G06F 12/00* (2006.01)
  *G06F 9/52* (2006.01)
  *G06F 12/12* (2006.01)

(52) U.S. Cl.
  CPC .............. *G06F 12/126* (2013.01); *G06F 9/524* (2013.01)
  USPC ............................ 711/165; 711/154; 711/170

(58) Field of Classification Search
  USPC .......................................... 711/154, 165, 170
  See application file for complete search history.

(56) References Cited

U.S. PATENT DOCUMENTS

| | | |
|---|---|---|
| 5,590,326 A | 12/1996 | Manabe |
| 7,093,230 B2 | 8/2006 | E et al. |
| 7,730,258 B1 | 6/2010 | Smith et al. |

OTHER PUBLICATIONS

Xiaoning Ding, BP-Wrapper: A System Framework Making Any Replacement Algorithms (Almost) Lock Contention Free, IEEE International Conference on Data Engineering, pp. 369-380, 2009.

*Primary Examiner* — Matthew Bradley
(74) *Attorney, Agent, or Firm* — Lowenstein Sandler LLP

(57) ABSTRACT

An apparatus and a method for providing amortized lock access in a data container is described. Each access from each thread of a process in a memory to each object of a data container in the memory is recorded in a queue of the data container. A queue manager determines whether the recorded number of accesses in the queue has reached a predetermined threshold. The queue manager executes a lock algorithm and an eviction algorithm on all objects in the data container when the recorded number of accesses in the queue has reached the predetermined threshold. The lock algorithm is configured to lock objects in the data container while the eviction algorithm is performed on the data container. The eviction algorithm is configured to evict one or more objects from the data container pursuant to the eviction algorithm.

20 Claims, 5 Drawing Sheets

LOCK AMORTIZATION IN A DATA COUNTER

TECHNICAL FIELD

Embodiments of the present invention relate to computing systems, and more particularly, to locking objects in a data container in a memory.

BACKGROUND

Programs can be executed by processing with multiple threads (multi-threading) in order to utilize a shared memory type multi-processor system effectively. In the multi-threading, threads can be executed in parallel by sharing the virtual space of the process. In switching the threads, there is no need to switch the virtual space, and only the minimum context switching is required. For this reason, it is possible to improve the performance of the parallel processing by the multi-processor system. These threads may be accessing shared data from data containers.

Data containers are a common abstractions in Object Oriented languages such as Java™. An instance of a data container holds a collection of other objects usually of the same data type. For example, DataContainer can include a container structure where data entries resides. Data containers are also thread safe. In other words, contents of a data container can be mutated by multiple threads concurrently. Yet contents of a data container do not get corrupted. In order to become thread safe, data containers implement some type of container locking, be it on the global container level itself, or on more fine grained level of container elements themselves.

However, overall system performance can seriously degrade when the locking mechanism is not appropriately implemented. Having a lock protected data container which is locked on every access can cause unacceptable levels of contention (this occurs whenever one process or thread attempts to acquire a lock held by another process or thread) especially in cases where batching operations on data container do not cause the state of container to become invalid or corrupted.

Every put, remove, get and other invoked data entries operations eventually end up in the data container. Therefore, the data container should be implemented in a way that does not impede overall system throughput. It is also known that the data container's memory footprint can not grow indefinitely because it would eventually run out of memory. To resolve the limited memory footprint, certain data entries are periodically evicted from the data container according to an eviction algorithm.

LRU (Least Recently Used) eviction algorithm, although simple and easy to understand, under performs in cases of weak access locality (e.g. one time access entries are not timely replaced, entries to be accessed soonest are unfortunately replaced). Recently, a new eviction algorithm—LIRS (Low Inter-Reference Recency Set Replacement) has gathered a lot of attention because it addresses weak access locality shortcomings of LRU yet it retains LRU's simplicity.

However, no matter which eviction algorithm is used, if eviction is not implemented in a scalable low lock contention approach, it can seriously degrade overall system performance. In order to perform any meaningful selection of entries for eviction, the data container has to be locked until appropriate eviction entries are selected. Having such a lock protected data container in turn causes high lock contention offsetting any eviction precision gained by sophisticated eviction algorithms.

BRIEF DESCRIPTION OF THE DRAWINGS

Embodiments of the present invention are illustrated by way of example, and not by way of limitation, in the figures of the accompanying drawings and in which.

DETAILED DESCRIPTION

Described herein is an apparatus and a method for providing amortized lock access in a data container. Each access from each thread of a process in a memory to each object of a data container in the memory is recorded in a queue of the data container. A queue manager determines whether the recorded number of accesses in the queue has reached a predetermined threshold. The queue manager executes a lock algorithm and an eviction algorithm on all objects in the data container when the recorded number of accesses in the queue has reached the predetermined threshold. The lock algorithm is configured to lock objects in the data container while the eviction algorithm is performed on the data container. The eviction algorithm is configured to evict one or more objects from the data container.

Figure 1:
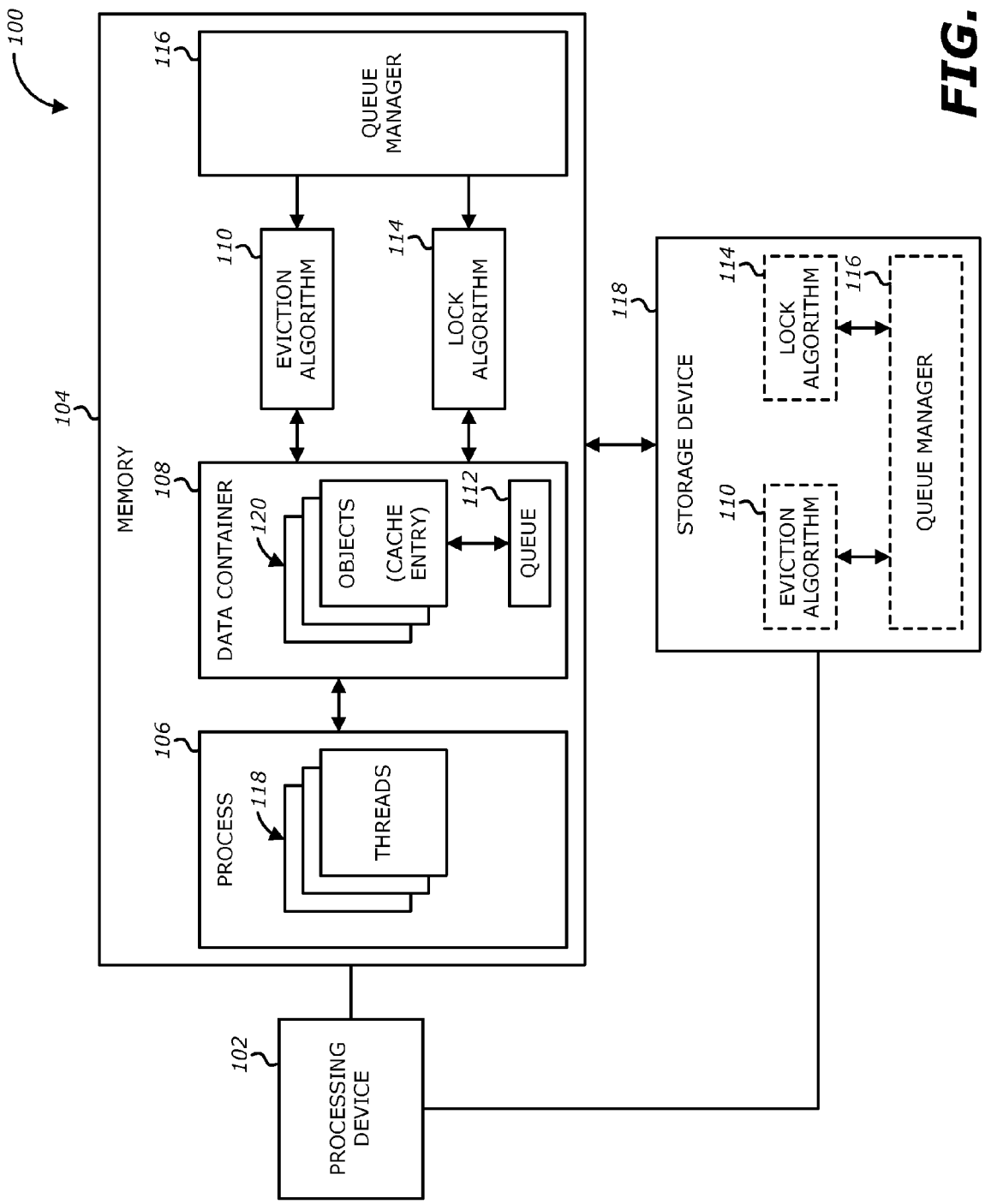
FIG. 1 is a block diagram illustrating one embodiment of a system for providing amortized lock access in a data container.

FIG. 1 is a block diagram illustrating one embodiment of a system 100 for providing amortized lock access in a data container. The system 100 includes a processing device 102 coupled to a memory 104. Processing device 102 represents one or more general-purpose processing devices such as a microprocessor, central processing unit, or the like. More particularly, the processing device may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device may also be one or more special-purpose processing devices such as an application specific integrated circuit (ASIC), a field programmable gate array (FPGA), a digital signal processor (DSP), network processor, or the like. Processing device 102 is configured to execute eviction algorithm 110, lock algorithm 114, and queue manager 116 for performing the operations and steps discussed herein with. In one embodiment, modules 110, 114, and 116 may be include hardware or software or a combination of both.

Memory 104 includes program instructions executable by processing device 102 to implement process 106. Process 106 may include one or more threads 118 configured to access objects 120 in data container 108. In one embodiment, objects 120 comprise, for example, cache entries from a system of network of tree-based cache nodes, such as Infinispan™ of Red Hat, Inc. In another embodiment, system 100 may be part of a computing system such as, for example, a networked desktop computer, a workstation, a server.

Memory 104 also stores an eviction algorithm 110, a queue 112, a lock algorithm 114, and a queue manager 116. In one embodiment, queue 112 resides in data container 108. Queue 112 is accessed by all threads 118 and records accesses to data container 108 by all threads 118.

Instead of making a trade-off between high precision eviction algorithm and low lock contention, queue manager 116 locks protected data container 108 but amortize the locking cost through batching updates with queue 112. Amortized lock is a process where the lock process is distributed into several installments instead of one lock for every thread access. In one embodiment, queue manager 116 wraps eviction algorithm 110 with a framework that keeps track of objects/data entries access 120 (e.g. cache access) per thread 118 (e.g. ThreadLocal) in queue 112.

For each cache entry hit 120 associated with a thread 118, thread manager 116 records the access in queue 112. In one embodiment, queue 112 is a simple queue for storing accesses in the order they are executed or received.

If queue 112 is full or the number of accesses recorded in queue 112 reaches a certain predetermined threshold, queue manager 116 acquires a lock on the objects in data container 108 with lock algorithm 114 and then execute operations defined by eviction algorithm 110—once for all the accesses in queue 112.

As such, threads 118 are allowed to read access data container 108 in a lock free approach while queue manager 116 records these accesses on a data container private lock-free queue 112. Lock-free thread safe queue 112 defines a few batching thresholds. As multiple threads 118 access data container 108 and in turn fill access queue 112, its batching thresholds are eventually reached. Accessing thread 118 that breaks batching threshold attempts to obtain container lock (and in cases it succeeds access queue records) can be used to perform any contextual operation on a data container—in one single shot while holding a container lock.

In cases where a thread 118 is not able to obtain container lock, the thread 118 simply returns. Threads 118 accumulate in queue 112 up until full capacity is reached. In that case accessing thread 118 waits to obtain a container lock and executes all contextual operations recorded on queue 112.

Therefore, using batching updates approach, the cost of lock contention is significantly lowered, access to locked structures is streamlined, and the precision of eviction algorithm such as LIRS is retained. Batching updates on the eviction algorithm 110 does not materially affect the accuracy of eviction algorithm 110.

Figure 2:
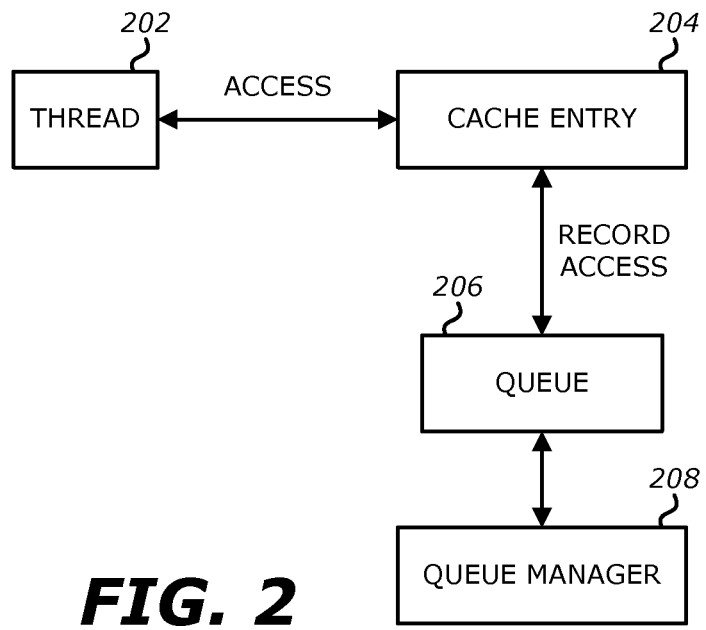
FIG. 2 is a block diagram illustrating an exemplary embodiment of a thread accessing a cache entry.

FIG. 2 is a block diagram illustrating an example of a thread accessing a cache entry. A thread 202 of a process may be allowed to access many cache entries 204 without requesting a lock to run the eviction replacement algorithm, or without paying the lock acquisition cost. For each access of cache entry 204 associated with thread 202, queue manager 208 records the access in the queue 206. In one embodiment, a process may include, but is not limited to, a virtual machine (e.g, a Java™ virtual machine). Queue manager 208 includes a predetermined threshold associated with thread 202.

Figure 3:
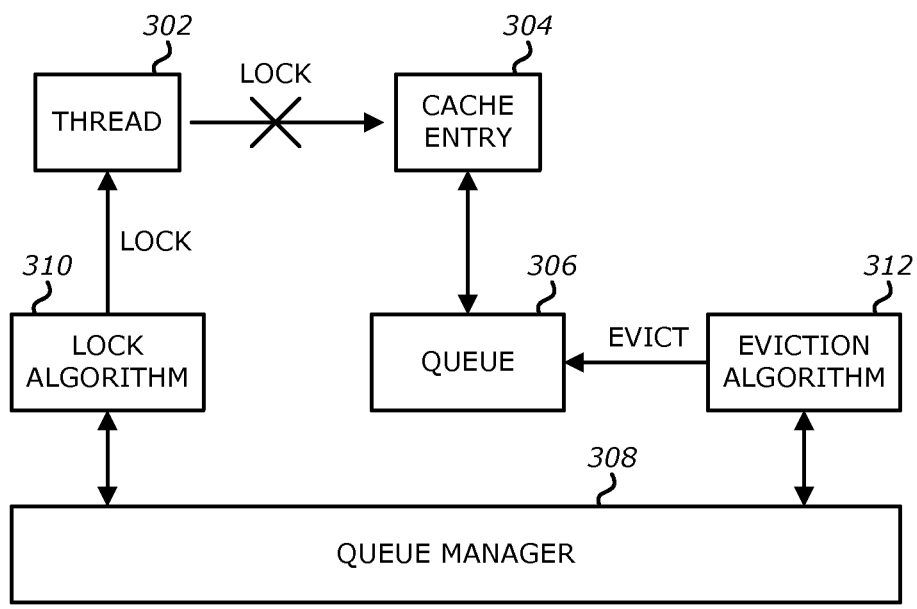
FIG. 3 is a block diagram illustrating an exemplary embodiment of an amortized lock and eviction process.

FIG. 3 is a block diagram illustrating an example of an amortized lock and eviction process. In case when queue 306 is full or has reached a predetermined threshold, queue manager 308 requests a lock from lock algorithm 310. As such, cache entries 304 are not accessible by thread 302.

With the lock implemented, queue manager 308 requests eviction operations defined by the eviction algorithm 312—once for all the accesses recorded in thread queue 306.

in one embodiment, eviction algorithm 312 may include, for example, a LRU (Least Recently Used) eviction algorithm, or a LIRS (Low Inter-Reference Recency Set Replacement). Alternatively, other eviction algorithms known in the art may be used.

in one embodiment, Infinispan's eviction algorithm is specified using strategy attribute of eviction XML element. The eviction algorithm can be selected (LIRS or LRU). There are two distinct approaches to actually evict entries from the cache: piggyback and the default approach using a dedicated EvictionManager thread.

Piggyback eviction thread policy does eviction by piggybacking on user threads that are hitting data container 108. Dedicated EvictionManager thread remains the default option. In order to support these two eviction thread policies, a new eviction attribute threadPolicy has been added to eviction element of Infinispan configuration schema.

Figure 4:
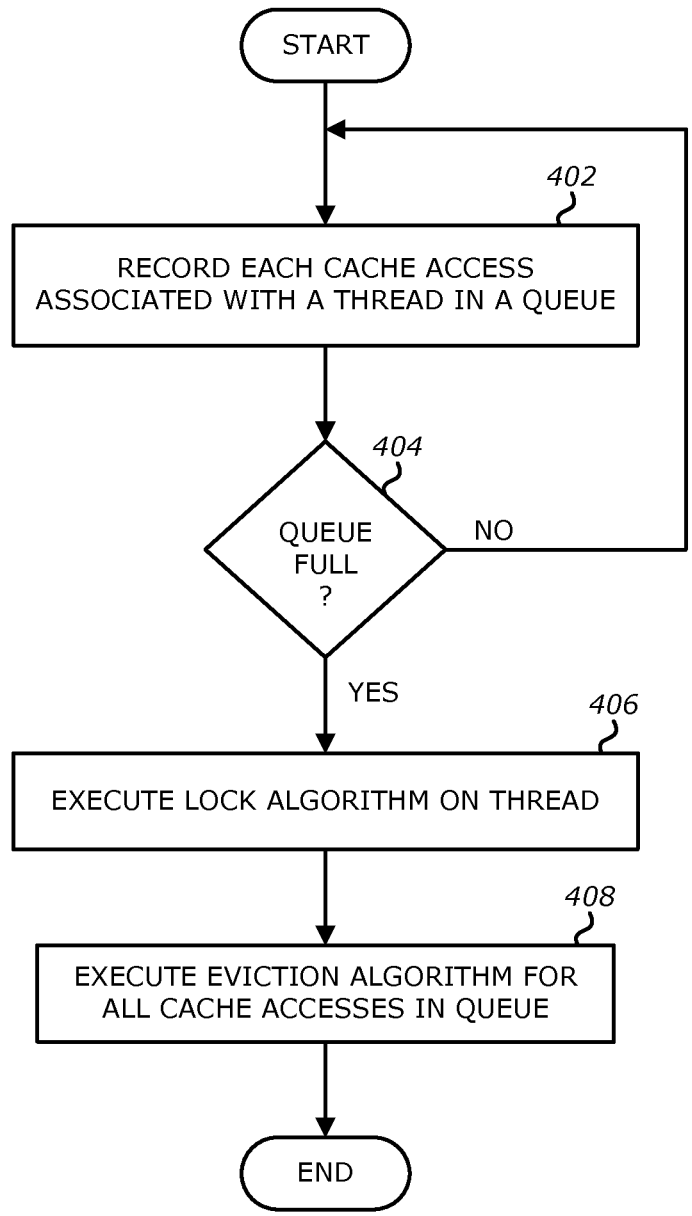
FIG. 4 is a flow diagram illustrating one embodiment of a method for amortized lock in a data container.

FIG. 4 is a flow diagram illustrating one embodiment of a method for amortized lock in a data container. At 402, a thread manager records each access from each thread of a process in a memory to each object of a data container in the memory in a queue. At 404, the queue manager determines whether the recorded number of accesses in the queue has reached a predetermined threshold or whether the queue is full. At 406, the queue manager executes a lock algorithm on all objects entries in the data container when the recorded number of accesses in the queue has reached the predetermined threshold. At 408, while the lock is in place, the queue manager requests execution of an eviction algorithm 110 on all object entries in the data container to evict selected object entries pursuant to the eviction algorithm 110.

As previously described, the lock algorithm 114 is configured to lock the data container while the eviction algorithm 110 is performed on the data container. The eviction algorithm 110 is configured to evict certain object entries from the data container 108 based on the eviction algorithm while the data container is locked. In one embodiment, the object entry includes a cache entry.

Figure 5:
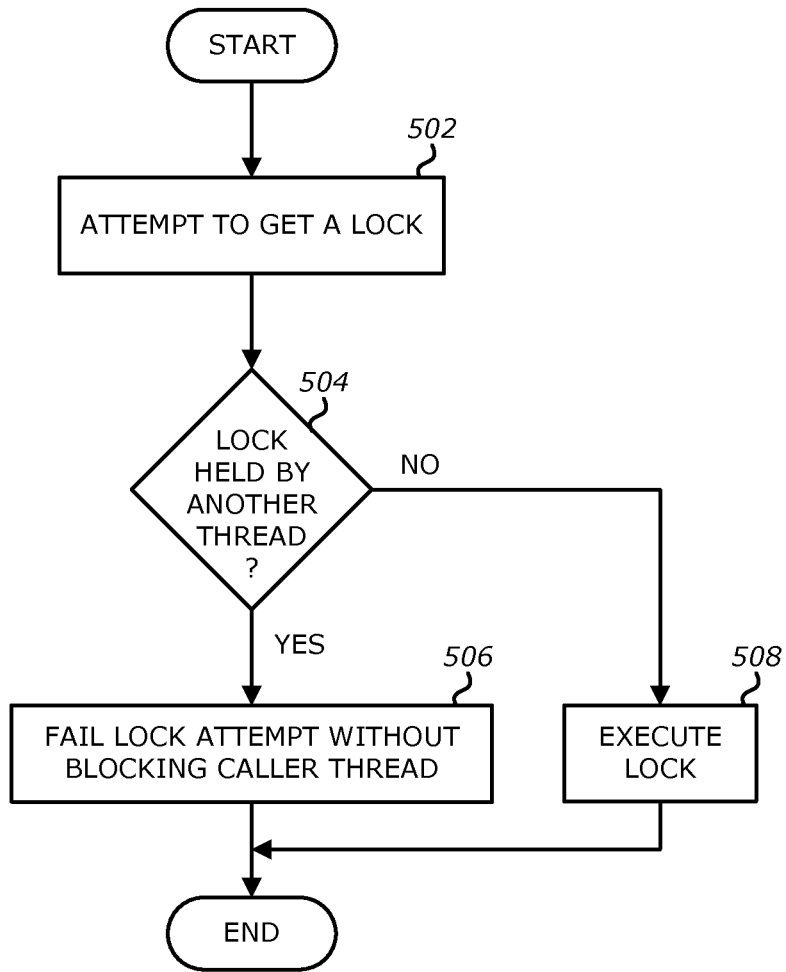
FIG. 5 is a flow diagram illustrating one embodiment of a method for obtaining a lock.

FIG. 5 is a flow diagram illustrating one embodiment of a method for obtaining a lock. Threads are allowed to access container elements without requesting a lock to run the eviction replacement algorithm, or without paying the lock acquisition cost. A non-blocking lock APIs (e.g. tryLock) may be used. tryLock makes an attempt to get the lock at 502 and if the lock is currently held by another thread 504, it fails without blocking its caller thread at 506 but otherwise executes a lock 508. Although tryLock uses little resources, it is not used for every container access but rather on certain pre-determined thresholds.

In contrast, a process executing on processing device 102 typically may request a lock for cache entries 120 in data container 108. If another process does not currently hold the lock for cache entries 120, lock algorithm 114 may issue the lock to the requesting process 106. If another process holds the lock for cache entries 120, the requesting process may continue executing another task while waiting for the lock.

Figure 6:
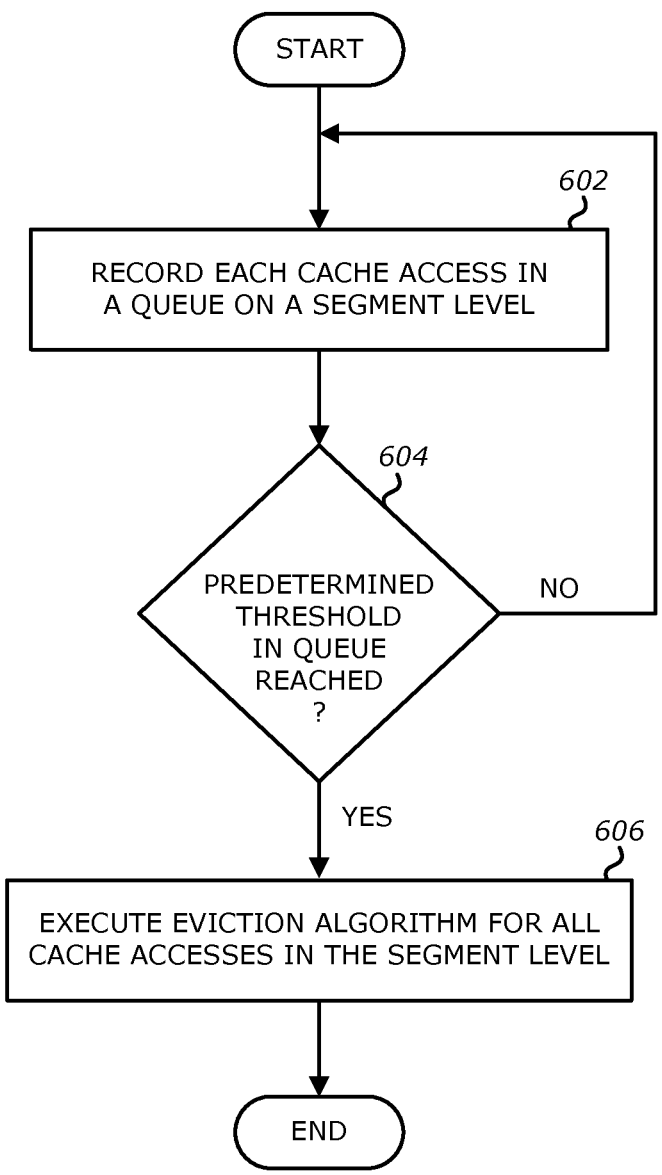
FIG. 6 is a flow diagram illustrating one embodiment of a method for amortized lock in a segment level.

FIG. 6 is a flow diagram illustrating another embodiment of a method for amortized lock in a segment level. Instead of recording entries accessed per thread in a data container, the accesses are recorded in a lock free queue on a segment level of a data container at 602. In one embodiment, a segment in a cache is a common hashtable whose entries are always kept in a consistent state and can be read without locking. The main reason not to use ThreadLocal is that there could potentially be hundreds of threads hitting the data container. Some of them may be very short lived and thus the corresponding thread queue could possibly never reach the batching thresholds. At 604 when predetermined thresholds are reached, the eviction algorithm is executed on the segment level instead of on the data container at 606.

In another embodiment, queue manager 116, eviction algorithm 110, queue 112, and lock algorithm 114 may reside on a data storage device 118. For example, data storage device 118 may include a non-transitory computer-readable storage medium on which is stored one or more sets of instructions embodying any one or more of the methodologies or functions described herein. The software may also reside, completely or at least partially, within a main memory and/or within the processing device during execution thereof by the computer system, the main memory and the processing device also constituting computer-readable storage media. The software may further be transmitted or received over a network via the network interface device.

While the computer-readable storage medium is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical and magnetic media.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "recording" or "executing" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    recording in a queue of a data container, by a processing device, a first access to a first object of the data container by a first thread of a process;
    recording in the queue, by the processing device, a second access to a second object of the data container by a second thread of the process; and
    when the number of accesses recorded in the queue reaches a threshold, locking the data container to prevent threads of the process from accessing objects of the data container and evicting an object of the data container while the data container is locked.

2. The method of claim 1 wherein the object is evicted from a cache using an eviction algorithm.

3. The method of claim 2 further comprising:
    recording, in a lock free thread safe queue, a third access to an entry in the cache; and
    executing the eviction algorithm when the number of accesses recorded in the lock free thread safe queue reaches a second threshold.

4. The method of claim 2 wherein the eviction algorithm comprises a Low Inter-Reference Recency Set Replacement (LIRS) policy.

5. The method of claim 2 wherein the eviction algorithm comprises a piggyback eviction thread policy that evicts an entry in the cache by piggybacking a thread that attempts to access the data container.

6. The method of claim 2 wherein a thread is allowed to access two or more items in the cache without requesting a lock.

7. The method of claim 1 wherein the threshold equals a maximum length of the queue.

8. A non-transitory computer-readable storage medium, having instructions stored therein, which when executed, cause a processing device to perform operations comprising:

recording in a queue of a data container, by the processing device, a first access to a first object of the data container by a first thread of a process;

recording in the queue, by the processing device, a second access to a second object of the data container by a second thread of the process; and when the number of accesses recorded in the queue reaches a threshold, locking the data container to prevent threads of the process from accessing objects of the data container and evicting an object of the data container while the data container is locked.

9. The non-transitory computer-readable storage medium of claim 8 wherein the object is evicted from a cache using an eviction algorithm.

10. The non-transitory computer-readable storage medium of claim 9 wherein the operations further comprise:

recording, in a lock free thread safe queue, a third access to an entry in the cache; and executing the eviction algorithm when the number of accesses recorded in the lock free thread safe queue reaches a second threshold.

11. The non-transitory computer-readable storage medium of claim 9 wherein the eviction algorithm comprises a Least Recently Used (LRU) policy.

12. The non-transitory computer-readable storage medium of claim 9 wherein the eviction algorithm comprises a piggyback eviction thread policy that evicts an entry in the cache by piggybacking a thread that attempts to access the data container.

13. The non-transitory computer-readable storage medium of claim 9 wherein a thread is allowed to access two or more items in the cache without requesting a lock.

14. The non-transitory computer-readable storage medium of claim 8 wherein the threshold equals a maximum length of the queue.

15. A computer system comprising:

a memory to store a data container; and a processing device, coupled to the memory, to:

record, in a queue of the data container, a first access to a first object of the data container by a first thread of a process;

record, in the queue, a second access to a second object of the data container by a second thread of the process; and when the number of accesses recorded in the queue reaches a threshold, locking the data container to prevent threads of the process from accessing objects of the data container and evicting an object of the data container while the data container is locked.

16. The computer system of claim 15 wherein the object is evicted from a cache using an eviction algorithm.

17. The computer system of claim 16 wherein the processing device is further to:

record, in a lock free thread safe queue, a third access to an entry in the cache; and execute the eviction algorithm when the number of accesses recorded in the lock free thread safe queue reaches a second threshold.

18. The computer system of claim 16 wherein the eviction algorithm comprises a Low Inter-Reference Recency Set Replacement (LIRS) policy.

19. The computer system of claim 16 wherein the eviction algorithm comprises a piggyback eviction thread policy that evicts an entry in the cache by piggybacking a thread that attempts to access the data container.

20. The computer system of claim 16 wherein a thread is allowed to access two or more items in the cache without requesting a lock.

* * * * *